United States Patent [19]

Gantioler et al.

[11] Patent Number: 5,703,521
[45] Date of Patent: Dec. 30, 1997

[54] CIRCUIT CONFIGURATION FOR MONITORING THE TEMPERATURE OF A POWER SEMICONDUCTOR COMPONENT

[75] Inventors: Josef-Matthias Gantioler; Holger Heil, both of Munich; Jenoe Tihanyi, Kirchheim, all of Germany

[73] Assignee: Siemens Aktiengesellschaft, Munich, Germany

[21] Appl. No.: 625,634

[22] Filed: Mar. 29, 1996

[30] Foreign Application Priority Data

Mar. 29, 1995 [DE] Germany ................. 195 11 505.8

[51] Int. Cl.⁶ ................. H01L 35/00; H03K 5/153
[52] U.S. Cl. ................. 327/512; 327/81; 327/432
[58] Field of Search ................. 327/77–81, 83, 327/88, 53, 512, 513, 143, 198, 433, 432, 478, 538, 543; 307/651; 323/315

[56] References Cited

U.S. PATENT DOCUMENTS

| 4,574,205 | 3/1986 | Nagano | 327/512 |
|---|---|---|---|
| 4,875,131 | 10/1989 | Leipold et al. | 361/103 |
| 4,943,737 | 7/1990 | Guo et al. | 327/513 |
| 4,999,567 | 3/1991 | Morigami | 323/315 |
| 5,095,227 | 3/1992 | Jeong | 307/310 |
| 5,304,861 | 4/1994 | Fruhauf et al. | 307/296.4 |
| 5,498,952 | 3/1996 | Ryat | 323/315 |

FOREIGN PATENT DOCUMENTS

| 0240807A1 | 10/1987 | European Pat. Off. | G01K 7/00 |
|---|---|---|---|
| 0240807B1 | 10/1987 | European Pat. Off. | G01K 7/00 |
| 0341482 | 11/1989 | European Pat. Off. | G01K 7/00 |
| 0523799 | 1/1993 | European Pat. Off. | G01K 7/00 |
| 3926656 | 11/1990 | Germany | G01K 7/24 |
| 69004695T2 | 4/1991 | Germany | G01K 7/00 |
| 91/06839 | 5/1991 | WIPO | G01K 7/00 |

*Primary Examiner*—Toan Tran
*Attorney, Agent, or Firm*—Herbert L. Lerner; Laurence A. Greenberg

[57] ABSTRACT

The temperature of a power semiconductor component is monitored by feeding the block current of a bipolar transistor which is in thermal contact with the component to an amplifying current mirror. The output signal of the current mirror is compared with a reference current. If the mirrored current is greater than the reference current, then the system produces a corresponding output. Temperatures of the power semiconductor component below 140° C. can be reliably detected.

8 Claims, 2 Drawing Sheets

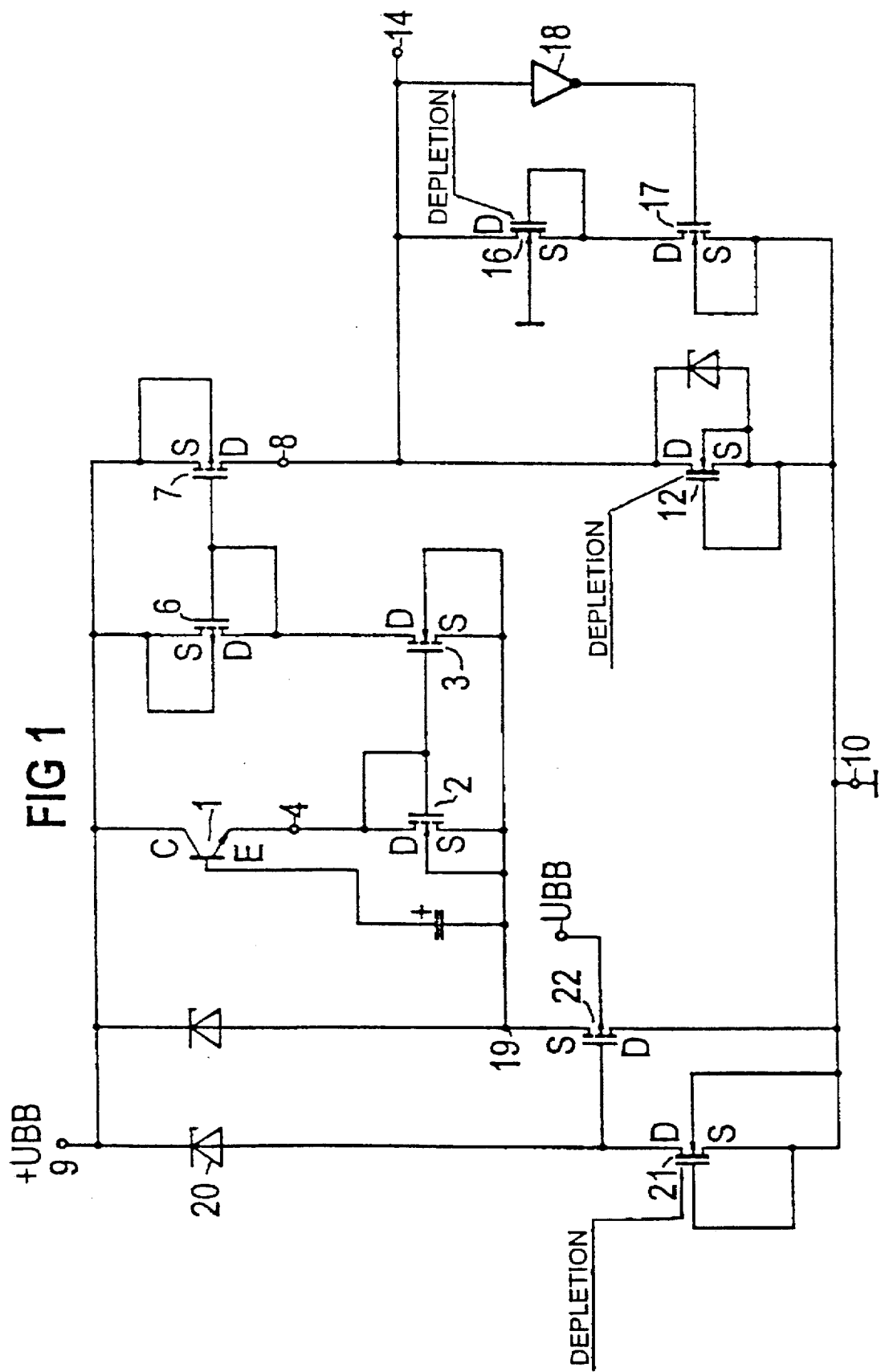

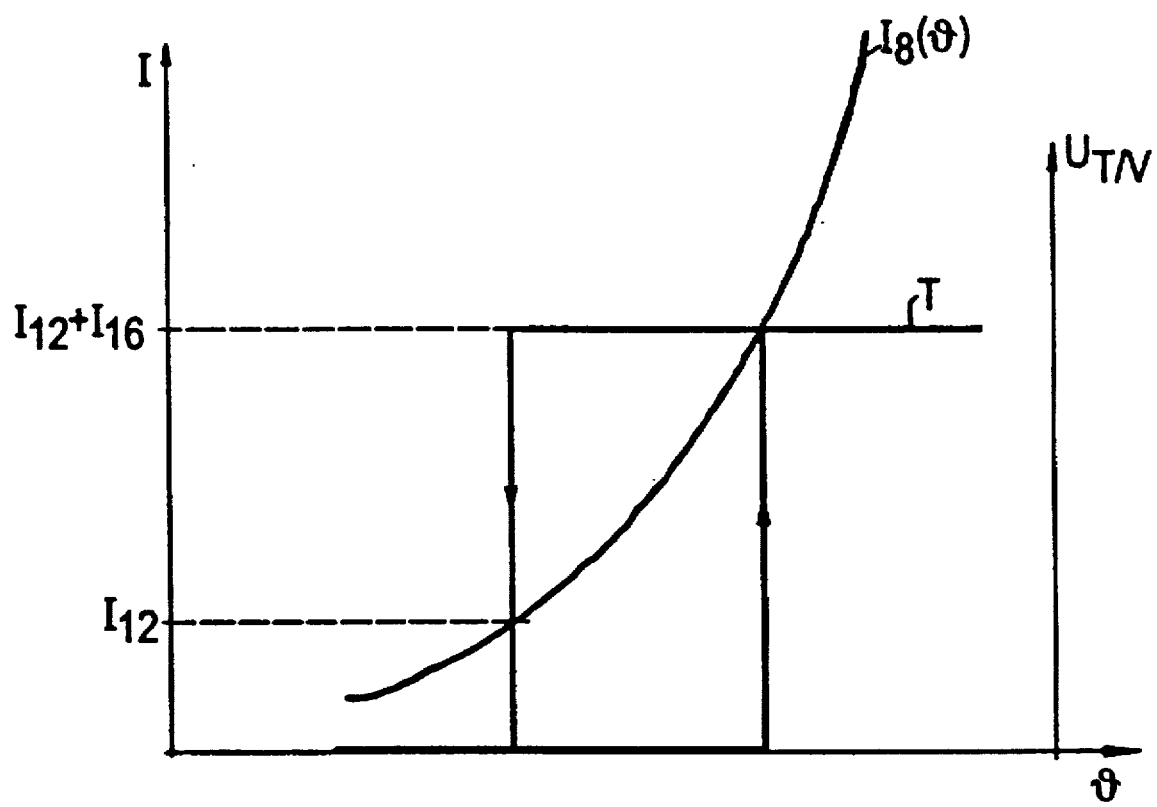

CIRCUIT CONFIGURATION FOR MONITORING THE TEMPERATURE OF A POWER SEMICONDUCTOR COMPONENT

BACKGROUND OF THE INVENTION

1. Field of the Invention

The invention relates to a circuit configuration for monitoring the temperature of a power semiconductor component; the circuit has a bipolar semiconductor element disposed in thermal contact with the semiconductor component, and the magnitude of the blocking-state current is a measure of the temperature of the power semiconductor component.

2. Description of the Related Art

One such circuit configuration has been known heretofore, for instance from European patent disclosure EP 0 240 807. That circuit has a bipolar transistor and a depletion MOSFET connected as a current source. The depletion MOSFET is connected in series with the bipolar transistor. The bipolar transistor is in thermal contact with the power semiconductor component which is to be measured. On the one hand, the current of the current source is adjusted such that it is greater than the blocking-state current of the bipolar transistor that flows when the power semiconductor component is at the normal operating temperature. On the other hand, it is adjusted such that it is lower than the blocking-state current that flows whenever the power semiconductor component has reached an excess temperature, such as 160° C. The transition from one state to another is accompanied by a significant voltage rise at the node between the bipolar transistor and the depletion FET. This voltage rise is evaluated as an excess temperature signal.

Since the blocking-state current of the bipolar transistor rises exponentially with its temperature, only temperatures of 160° C. and higher can be reliably detected with this circuit configuration.

For some applications, however, it is necessary not only to detect an excess temperature of approximately 160° but already to detect the rise from the normal operating temperature, for instance 125° C., to 140° C., for instance. At such a low temperature, the blocking-state current is on the order of magnitude of only 100 nA and can therefore no longer be reliably detected with the prior art devices.

SUMMARY OF THE INVENTION

It is accordingly an object of the invention to provide a circuit configuration for monitoring the temperature of a power semiconductor component, which overcomes the above-mentioned disadvantages of the heretofore-known devices and methods of this general type and which can reliably detect temperatures even below 160° C.

With the foregoing and other objects in view there is provided, in accordance with the invention, a circuit configuration for monitoring a temperature of a power semiconductor component, comprising:

a bipolar semiconductor element disposed in thermal contact with the power semiconductor component, the bipolar semiconductor element having a blocking-state current, and a magnitude of the blocking-state current being a measure of the temperature of the power semiconductor component;

an amplifying current mirror connected to receive and amplify the blocking-state current, and means for comparing the amplified current with a reference current.

In accordance with an added feature of the invention, the current mirror includes two MOSFETs with a different ratio between a channel length and a channel cross section thereof and with otherwise substantially identical parameters.

In accordance with an additional feature of the invention, the current mirror with the two MOSFETs is a first current mirror, and including a second amplifying current mirror connected to receive a mirrored current from the first current mirror, the second current mirror producing an amplified current to be compared with the reference current.

In accordance with another feature of the invention, the second current mirror includes two MOSFETs with a different ratio between a channel length and a channel cross section thereof and with otherwise identical parameters.

In accordance with again an added feature of the invention, the circuit configuration includes a depletion MOSFET generating the reference current, the depletion MOSFET being connected as a constant current source outputting a current greater than a mirrored current output by the current mirror at normal temperature, and less than the mirrored current at an excess temperature of the power semiconductor component.

In accordance with again an additional feature of the invention, the bipolar semiconductor element is a bipolar transistor connected in series with the current mirror, and including a voltage stabilizer having an output connected to the series circuit of the bipolar transistor and the current mirror.

In accordance with again another feature of the invention, the circuit includes first and second operating voltage terminals at which an operating voltage is present, the voltage stabilizer including a series circuit formed of a Zener diode and a depletion FET, the depletion FET being of a first channel type and being connected as a constant current source, the series circuit being connected between the first and the second operating voltage terminals; and including an enhancement FET of a second channel type, the enhancement FET having a gate terminal connected to a node between the Zener diode and the depletion FET; and the enhancement FET being connected between the current mirror and the second operating voltage terminal.

In accordance with again a further feature of the invention, the circuit includes a depletion FET having a drain-to-source path connected to the second operating voltage terminal and connected to receive an output of the current mirror, the depletion FET being connected as a current source, and including an output terminal of the circuit configuration, the output terminal carrying an output of the current mirror.

In accordance with a concomitant feature of the invention, the circuit includes a further depletion FET which is connected as a current source and which has a drain-to-source path connected to the output of the circuit 5 configuration; an enhancement FET having a gate terminal and having a drain-to-source path connected to the second operating voltage terminal; the drain-to-source paths of the FETs being connected to one another; an inverter having an input connected to the output; and the inverter having an inverter output connected to the gate terminal of the enhancement FET.

In most simplified terms, the object of the invention is satisfied in that the blocking-state current is supplied to an amplifying current mirror, and that the amplified current is compared with a reference current.

Other features which are considered as characteristic for the invention are set forth in the appended claims.

Although the invention is illustrated and described herein as embodied in a circuit configuration for detecting the temperature of a power semiconductor component, it is nevertheless not intended to be limited to the details shown, since various modifications and structural changes may be made therein without departing from the spirit of the invention and within the scope and range of equivalents of the claims.

The construction of the invention, however, together with additional objects and advantages thereof will be best understood from the following description of the specific embodiment when read in connection with the accompanying drawings.

BRIEF DESCRIPTION OF THE DRAWINGS

FIG. 1 is a schematic circuit diagram of the circuit according to the invention; and FIG. 2 is a graph plotting an output current as a function of the temperature.

DESCRIPTION OF THE PREFERRED EMBODIMENTS

Referring now to the figures of the drawing in detail, there is seen an exemplary layout of the circuit according to the invention in FIG. 1, and an illustration of the output current of the current mirror as a function of the temperature in FIG. 2.

Referring now specifically to FIG. 1, the circuit configuration of the invention includes a bipolar semiconductor component 1, which may be a transistor. It is also possible in principle, however, to use a thyristor.

The bipolar transistor 1 is connected to an input 4 of an amplifying current mirror. The current mirror comprises MOSFETs 2 and 3 and MOSFETs 6 and 7. The drain terminal of the MOSFET 2 is connected to the input 4 and to its own gate terminal (MOSFET 2) and to the gate of the MOSFET 3. It is thus connected as a diode. The drain terminal of the MOSFET 3 is connected to the drain terminal of the MOSFET 6 and to the gate terminals of both MOSFETs 6, 7.

The MOSFETs 6 and 7 are of the p-channel type, while the MOSFETs 2 and 3 are of the n-channel type. The source terminals of the MOSFETs 6, 7 and the collector terminal of the bipolar transistor 1 are connected to a first operating voltage terminal 9. The source terminals of the MOSFETs 2 and 3 are connected to an output 19 of a constant voltage source. The current mirror 2, 3, 6, 7 is connected via an output 8 to the drain terminal of a depletion FET 12, whose source terminal is connected to a second supply voltage terminal 10. The output 8 is also connected to an output 14.

To explain the function, it will be assumed, without explaining the function of the constant current source, that a constant voltage is available between the terminals 9 and 19. In that case, a blocking-state current that is delivered to the first current mirror 2, 3 flows through the bipolar transistor 1 as a function of its temperature.

The MOSFETs 2, 3 have identical properties, except for a different ratio between the channel cross section and the channel length. The current of the bipolar transistor flows out through the MOSFET 2 (connected as a diode), to the input 19 and the terminal 10. The MOSFET 3 then draws a current through the diode-connected MOSFET 6 which is higher in accordance with the ratio between the quotient of the channel cross section to the channel length of the two MOSFETs 2 and 3. This current also flows away via the output 19 to the terminal 10. The current flowing through the MOSFET 6 is amplified again in the MOSFET 7 in accordance with the ratio of the quotients of the channel length to the channel cross section of the two MOSFETs 6 and 7 and flows via the output 8 and the depletion FET 12 to the terminal 10.

The bipolar transistor, the current mirror 2, 3, 6, 7, on the one hand and the depletion FET 12 on the other are dimensioned in such a way that the current flowing from the output 8, at a predetermined temperature that is below the maximum allowable temperature of the power semiconductor component, is less than the maximum current through the depletion FET 12. A potential is then present at the output 14 that is in the vicinity of the potential of the terminal 10, for instance zero potential. On the other hand, the circuit configuration is dimensioned such that the current through the output 8 that flows when the temperature of the power semiconductor component is elevated but is below the maximum allowable temperature is greater than the maximum current of the depletion FET 12. In that case, a voltage is present at the output 14 that is equal to +UBB, minus the drain-to-source voltage of the MOSFET 7. This elevated voltage between the output 14 of the terminal 10 can then be interpreted as a temperature rise to a temperature of, say, 140° C., which is below the critical temperature.

The amplification factor of the current mirror depends on which current can still be detected without interference. For instance, if this current is 1 mA and if the bipolar transistor 1 at a temperature of 140° draws only 100 nA, then the amplification factor must be 10,000. The total amplification is the product of the amplifications of the MOSFETs 2, 3 on the one hand and the MOSFETs 6, 7 on the other. These pairs in turn each form one current mirror. By the described combination of the current mirror 2, 3 with the current mirror 6, 7, a very simple possibility of amplifying a weak current by several powers of 10 is created at little expense.

For some applications, a switching behavior with hysteresis is desirable. This means that the voltage at the output 14 jumps to the level H at a temperature that is higher than the temperature at which the level at the output 14 is reset to L. This can be accomplished in a simple way by connecting a depletion FET 16, connected as a current source, to the output 14, and connecting an enhancement FET 17 in series with the depletion FET. In the exemplary embodiment, the drain terminal of 16 is connected to the output 14, while its source terminal is connected to the drain terminal of 17. The source terminal of 17 is connected to the operating voltage terminal 10. Also connected to the output 14 is the input of an inverter 18, whose output is connected to the gate terminal of the FET 17.

The series circuit of the FETs 16 and 17 forms a shunt for the current flowing through the output 8, as long as the level at the output 14 is L. The FET 17 is then made conducting. If the current at the output 8 rises further, until the highest current of the current sources 12 and 16 is reached, then the potential at the output 14 jumps to the level H, and the FET 17 is blocked. The shunt of the FET 12 is thus undone, and the level at the output 14 is not reset from H to L again until the current through the output 8 drops below the highest current through the FET 12. This hysteresis behavior is illustrated in FIG. 2.

The hysteresis behavior described can also be attained if a higher temperature, such as 160° C., is to be detected as the excess temperature. It is then possible to supply the blocking-state current of the bipolar transistor 1 directly to the depletion FET 12, that is, without going through the current mirror, and to connect the hysteresis circuit 16, 7, 18 parallel to this depletion FET.

The voltage stabilizer to whose output 19 the source terminals of the FETs 2, 3 are connected comprises a Zener diode 20, with which a depletion FET 21 (connected as a current source) is connected in series. The anode terminal of the Zener diode 20 is connected to the drain terminal of 21. A gate terminal of an enhancement FET 22 is connected to the node between the Zener diode 20 and the depletion FET 21, and its source terminal is connected to the output 19. Its drain terminal is connected to the second operating voltage terminal 10. The FETs 21 and 22 are of complementary channel types. The mode of operation of the stabilizer is such that a constant current flows through the series circuit of 20 and 21, and therefore the gate-to-source voltage and thus the voltage at the output 19 are also constant.

If the circuit is embodied as an integrated circuit with self-insulation, then the bulk terminal of 22 is connected to the terminal 9, and the bulk terminal of the depletion FET 16 is connected to the terminal 10.

If the operating voltage at the terminal 9 is negative as compared with the terminal 10, then it is necessary to use FETs and bipolar transistors each of complementary channel types.

A capacitor is connected to the base of the bipolar transistor 1, so as to improve its interference resistance. In the steady state, it operates with an open base, while if an interference pulse occurs the base-to-emitter voltage is clamped at its previous value for the duration of the interference pulse. As a result, interference pulses are rendered ineffective.

We claim:

1. A circuit configuration for monitoring a temperature of a power semiconductor component, comprising:
   a bipolar semiconductor element connected in a thermally conducting manner a power semiconductor component, said bipolar semiconductor element having a blocking-state current, and a magnitude of the blocking-state current being a measure of a temperature of the power semiconductor component;
   an amplifying current mirror connected to receive and amplify the blocking-state current;
   a depletion MOSFET generating a reference current, said depletion MOSFET being connected as a constant current source outputting a current greater than a mirrored current output by said amplifying current mirror at a normal temperature, and less than the mirrored current at an excess temperature of the power semiconductor component; and
   means for determining when the mirrored current exceeds the reference current.

2. The circuit configuration according to claim 1, wherein said current mirror includes two MOSFETs with a different ratio between a channel length and a channel cross section thereof and with otherwise substantially identical parameters.

3. The circuit configuration according to claim 2, wherein said current mirror with said two MOSFETs is a first current mirror, and including a second amplifying current mirror connected to receive a mirrored current from said first current mirror, said second current mirror producing an amplified current to be compared with the reference current.

4. The circuit configuration according to claim 3, wherein said second current mirror includes two MOSFETs with a different ratio between a channel length and a channel cross section thereof and with otherwise identical parameters.

5. A circuit configuration for monitoring a temperature of a power semiconductor component, comprising:
   a bipolar transistor connected in a thermally conducting manner with a power semiconductor component, said bipolar transistor having a blocking-state current, and a magnitude of the blocking-state current being a measure of a temperature of the power semiconductor component;
   an amplifying current mirror being connected to receive and amplify the blocking-state current, said amplifying current mirror outputting a mirrored current, said bipolar transistor connected in series with said current mirror;
   a voltage stabilizer having an output connected to the series circuit of said bipolar transistor and said current mirror, said voltage stabilizer including a series circuit formed of a Zener diode and a depletion FET, said depletion FET being of a first channel type and being connected as a constant current source;
   first and second operating voltage terminals at which an operating voltage is present, said Zener diode and depletion FET series circuit being connected between said first and said second operating voltage terminals;
   an enhancement FET of a second channel type, said enhancement FET having a gate terminal connected to a node between said Zener diode and said depletion FET, said enhancement FET being connected between said current mirror and said second operating voltage terminal; and
   means for determining when the mirrored current exceeds a reference current.

6. The circuit configuration according to claim 5, including a depletion FET having a drain-to-source path connected to said second operating voltage terminal and connected to receive an output of said current mirror, said depletion FET being connected as a current source supplying the reference current, and including an output terminal of the circuit configuration, said output terminal carrying an output of said current mirror.

7. A circuit configuration for monitoring a temperature of a power semiconductor component, comprising:
   a bipolar semiconductor element connected in a thermally conducting manner with a power semiconductor component, said bipolar semiconductor element having a blocking-state current, and a magnitude of the blocking-state current being a measure of a temperature of the power semiconductor component;
   an amplifying current mirror connected to receive and amplify the blocking-state current, said amplifying current mirror outputting a mirrored current;
   means for determining when the mirrored current exceeds a reference current;
   an operating voltage terminal;
   a depletion FET having a drain-to-source path connected to said operating voltage terminal and connected to receive the mirrored current, said depletion FET being connected as a current source; and
   an output terminal of the circuit configuration, said output terminal carrying the mirror current.

8. The circuit configuration according to claim 7, including a further depletion FET being connected as a current source and having a drain-to-source path connected to said output of the circuit configuration; an enhancement FET having a gate terminal and having a drain-to-source path connected to said operating voltage terminal; said drain-to-source paths of said FETs being connected to one another; an inverter having an input connected to said output; and said inverter having an inverter output connected to said gate terminal of said enhancement FET.

* * * * *